United States Patent
Arai

(10) Patent No.: US 11,267,280 B2
(45) Date of Patent: Mar. 8, 2022

(54) DECORATIVE MOLDED ARTICLE

(71) Applicant: KABUSHIKI KAISHA KAWAI GAKKI SEISAKUSHO, Hamamatsu (JP)

(72) Inventor: Kensuke Arai, Hamamatsu-shi (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 0 days.

(21) Appl. No.: 16/825,861

(22) Filed: Mar. 20, 2020

(65) Prior Publication Data
US 2020/0307302 A1 Oct. 1, 2020

(30) Foreign Application Priority Data
Mar. 27, 2019 (JP) .............................. JP2019/060046

(51) Int. Cl.
| | | |
|---|---|---|
| *B44F 1/06* | (2006.01) | |
| *B32B 21/08* | (2006.01) | |
| *B32B 21/14* | (2006.01) | |
| *F21V 9/08* | (2018.01) | |
| *F21W 121/00* | (2006.01) | |

(52) U.S. Cl.
CPC ............... *B44F 1/06* (2013.01); *B32B 21/08* (2013.01); *B32B 21/14* (2013.01); *F21V 9/08* (2013.01); *B32B 2255/08* (2013.01); *B32B 2255/26* (2013.01); *B32B 2307/402* (2013.01); *B32B 2307/412* (2013.01); *F21W 2121/00* (2013.01)

(58) Field of Classification Search
CPC ... B32B 21/08; B32B 21/14; B32B 2307/402; B32B 2307/412; B32B 2255/08; B32B 2255/26; B44F 1/06; B44F 1/08; B27D 5/00; F21V 9/08; F21W 2121/00; B60Q 3/00; B60Q 3/10; B60Q 3/14; B60Q 3/12; B60Q 3/54; B60Q 3/20; B60Q 3/51; B60Q 3/745; B60Q 2500/10; B60K 2370/339
See application file for complete search history.

(56) References Cited

U.S. PATENT DOCUMENTS

| | | | | |
|---|---|---|---|---|
| 2002/0031620 A1* | 3/2002 | Yuzawa | ................... | B27D 1/00 428/1.1 |
| 2010/0080970 A1* | 4/2010 | Hayes | ..................... | B32B 15/08 428/209 |
| 2019/0063722 A1* | 2/2019 | Sugiyama | ................. | B32B 7/12 |

FOREIGN PATENT DOCUMENTS

JP        4469463        12/2001

\* cited by examiner

*Primary Examiner* — Catherine A. Simone
(74) *Attorney, Agent, or Firm* — Lewis Roca Rothgerber Christie LLP

(57) ABSTRACT

A decorative molded article has a light source disposed on a back side, for causing different designs to appear on a front surface side thereof, when the light source is off and when on, respectively. A base made of a predetermined synthetic resin permeable to light from the light source is disposed close to the light source. A wood veneer having a grain and permeable to light from the light source is disposed on a front side of the base. A colored coating layer is formed on a front side of the base using a paint having a predetermined color and a clear coating layer is formed on a front side of the colored coating layer using a transparent clear paint. The colored coating layer makes the grain difficult to visually recognize when the light source is off and visually recognizable when on.

6 Claims, 7 Drawing Sheets

DECORATIVE MOLDED ARTICLE

CROSS-REFERENCE TO RELATED APPLICATION(S)

This application claims priority to Japanese Patent Application Number 060046/2019, filed on Mar. 27, 2019, the entire contents of which are incorporated herein by reference.

BACKGROUND OF THE INVENTION

Field of the Invention

The present invention relates to a decorative molded article that is applied to interior components of automotive vehicles or exterior components of home appliances, and causes designs different from each other to appear on a front surface side thereof, when a light source disposed on a back surface side thereof is off and when the same is on, respectively.

Description of the Related Art

Conventionally, as this kind of decorative molded article, there has been known, for example, one disclosed in Japanese Patent No. 4469463 already filed by and granted to the present applicant. This decorative molded article is comprised of a wood veneer made by slicing wood, a base joined to a back surface of the wood veneer, a design layer attached to a back surface side of the base, and a top coat layer provided on a front surface of the wood veneer by coating. The wood veneer is formed to be very thin and has a predetermined transparency. Further, the base is made of a transparent synthetic resin and is integrally formed on the back surface of the wood veneer by injection molding. The design layer is formed as a patterned or colored one and is configured to be removable from the base. The top coat layer is made of a transparent synthetic resin, for protection of the front surface of the decorative molded article and is polish-finished.

By arranging the base formed of the transparent synthetic resin on the back surface side of the wood veneer having the transparency, the decorative molded article constructed as described above can obtain a unique beautiful finish which is emphasized in the depth feeling and the glossy feeling (appearance of glossiness varying with the angle of viewing) of the wood veneer. Further, by providing the design layer on the back surface side of the base, the design layer appears in a stat seen through the transparent base and looks combined with the wood veneer, whereby a variety of changes are given to a woodgrain pattern and a color tone of the wood veneer.

Further, the decorative molded article described above is capable of being illuminated from the back surface side thereof by the light source, and when the illumination is performed, the wood veneer and the design layer are illuminated, whereby a design based on the wood veneer and the design layer appears as if rising to the surface even in a dark place.

In a case where the conventional decorative molded article described above is applied to an interior component of an automotive vehicle, the design based on the wood veneer and the design layer appears in a vehicle compartment, which enhances the quality appearance of the vehicle compartment. Further, when the decorative molded article is illuminated from the back surface side thereof, the design based on the wood veneer and the design layer appears as if rising to the surface even when the vehicle compartment is dark.

However, in the decorative molded article described above, a basic design based on the wood veneer and the design layer does not change, and hence the design appearing on the front surface of the decorative molded article is not very different between when the light source is on and when the same is off. Further, it is possible, by replacing one design layer attached to the back surface side of the base with another, to make the design appearing on the front surface of the decorative molded article largely different from before the replacement. However, it is required to replace the design layer after once removing the decorative molded article already installed as the interior component of the automotive vehicle. The replacement work is troublesome.

Further, in recent years, for interior components of automotive vehicles and exterior components of home appliances, color that adds a quality appearance, e.g. glossy black, which is called jet black or piano black, is used. The use of such a black color makes it possible to enhance the quality appearance or profound feeling of the vehicle compartment. However, in such a decorative molded article provided with the only color of black, the design appearing on the front surface thereof is sometimes felt dull.

SUMMARY OF THE INVENTION

It is an object of the present invention to provide a decorative molded article capable of largely changing a design appearing on a front surface side thereof, depending on whether a light source is on or off.

To attain the above object, the present invention provides a decorative molded article that is configured to be capable of being illuminated by a light source disposed on a back surface side thereof, and cause designs different from each other to appear on a front surface side thereof, when the light source is off and when the light source is on, respectively, comprising a base that is made of a predetermined synthetic resin permeable to light from the light source, and is disposed in the vicinity of the light source, a wood veneer that is formed by slicing wood such that the wood veneer has a grain and is permeable to light from the light source, the wood veneer being disposed on a front surface side of the base, a colored coating layer that is formed on a front surface side of the wood veneer by coating with a colored paint having a predetermined color, for making the grain of the wood veneer difficult to visually recognize when the light source is off and making the grain of the wood veneer visually recognizable when the light source is on, and a clear coating layer that is formed on a front surface side of the colored coating layer by coating with a transparent clear paint.

According to this construction, the wood veneer that has a grain and is permeable to light from the light source is disposed on the front surface side of the base made of a predetermined synthetic resin, and the colored coating layer is formed on the front surface side of the wood veneer by coating with a colored paint having a predetermined color. Further, the clear coating layer is formed on the front surface side of the colored coating layer, by coating with a transparent clear paint. The colored coating layer provided on the front surface side of the wood veneer makes the grain of the wood veneer difficult to visually recognize (including "impossible to visually recognize" in the present specification) when the light source disposed on the back surface side of the decorative molded article is off, and on the other hand, makes the grain of the wood veneer visually recognizable when the light source is on. In other words, when the light source is off, the grain of the wood veneer is difficult to visually recognize and a design based on the color of the colored coating layer and the clear coating layer appears on the front surface side of the decorative molded article. On the other hand, when the light source is on, a design, which looks as if the grain of the wood veneer rises to the surface, appears on the front surface side of the decorative molded article. Thus, it is possible to obtain the decorative molded article that is capable of largely changing the design appearing on the front surface side thereof depending on whether the light source is on or off.

Preferably, the wood veneer has vessels opening outward, on the front surface side thereof, and the colored coating layer and the clear coating layer are each formed as a thin film having such a predetermined thickness that the vessels are not buried.

According to the construction of this preferred embodiment, the wood veneer has vessels opening outward, on the front surface side thereof, and the colored coating layer and the clear coating layer, provided on the front surface side of the wood veneer, are each formed as a thin film having such a predetermined thickness that the vessels are not buried. This provides the front surface of the decorative molded article with an open-pore finish in which recesses of the vessels remain, so that it is possible to obtain the decorative molded article the front surface of which has a concave convex feeling. Further, since the colored coating layer is formed as such a thin film described above, it is possible to easily realize the decorative molded article which makes the grain of the wood veneer visually recognizable when the light source is on.

Preferably, the wood veneer has vessels opening outward, on the front surface side thereof, the colored coating layer is formed as a thin film having such a predetermined thickness that the vessels are not buried, and the clear coating layer is formed as a thick film having such a predetermined thickness that the vessels are buried.

According to the construction of this preferred embodiment, the colored coating layer provided on the front surface side of the wood veneer is formed as a thin film having such a predetermined thickness that the vessels are not buried, and hence, similar to the preferred embodiment corresponding to claim 2, it is possible to easily realize the decorative molded article which makes the grain of the wood veneer visually recognizable when the light source is on. Further, since the clear coating layer is formed as a thick film having such a predetermined thickness that the vessels are buried, it is possible, by smoothing the surface of the clear coating layer, to obtain the decorative molded article having a glossy surface.

Preferably, the clear coating layer is formed as a colored clear coating layer in which the colored paint is mixed with the clear paint.

According to the construction of this preferred embodiment, as the clear coating layer provided on the front surface side of the colored coating layer, the colored clear coating layer is formed in which the colored paint is mixed with the clear paint. Therefore, by changing the mixing ratio of the colored paint to the clear paint and the thickness of the colored clear coating layer, it is possible to change the light and shade of the color of the design appearing on the front surface side of the decorative molded article.

Preferably, the clear coating layer includes a first clear coating layer laminated on the front surface of the colored coating layer, and a second clear coating layer laminated on another colored coating layer formed by coating a front surface of the first clear coating layer with a colored paint having a predetermined color.

According to the construction of this preferred embodiment, on the front surface of the first clear coating layer laminated on the front surface of the colored coating layer, the other colored coating layer is provided, and on the front surface of the other colored coating layer, the second clear coating layer is laminated. In this case, for example, by changing the thickness of the other colored coating layer, it is possible to easily change the light and shade of the color of the design appearing on the front surface of the decorative molded article, similar to the preferred embodiment corresponding to claim 4. Further, for example, by forming the second clear coating layer laminated on the other colored coating layer to a relatively large thickness, it is possible to form the front surface of the decorative molded article such that it has an increased depth feeling. Moreover, for example, by forming the other colored coating layer on the front surface of the first clear coating in a state in which the front surface of the first clear coating is smoothed, it is possible to make the front surface of the decorative molded article uniform in color.

Preferably, the predetermined color is black.

According to the construction of this preferred embodiment, the colored coating layer is formed using a black paint, and hence, for example, by smoothing the front surface of the clear coating layer, it is possible to obtain the decorative molded article in which a so-called piano-black design, with a black and glossy surface, is caused to appear when the light source is off.

Preferably, a reinforcing member configured to be permeable to light from the light source is disposed between the wood veneer and the base.

According to the construction of this preferred embodiment, the above-described reinforcing member is disposed between the wood veneer and the base, and hence, it is possible to reinforce the wood veneer while maintain the light permeability when the light source is off. Further, compared with a case in which the base is directly formed on the back surface of the wood veneer by injection molding or the like, it is possible to prevent the wood veneer from being cracked or discolored during manufacturing of the decorative molded article.

The above and other objects, features, and advantages of the present invention will become more apparent from the following detailed description taken in conjunction with the accompanying drawings.

BRIEF DESCRIPTION OF THE DRAWINGS

FIGS. 2A and 2B are a plan view and a cross-sectional view, respectively, of the decorative molded article shown in FIG. 1, in a state in which the light source is on.

FIGS. 3A and 3B are a plan view and a cross-sectional view, respectively, of a decorative molded article according to a second embodiment of the present invention, in a state in which a light source is on.

FIGS. 5A and 5B are a plan view and a cross-sectional view, respectively, of a decorative molded article according to a fourth embodiment of the present invention, in a state in which a light source is on.

FIGS. 6A and 6B are a plan view and a cross-sectional view, respectively, of a decorative molded article according to a fifth embodiment of the present invention, in a state in which a light source is on.

DETAILED DESCRIPTION OF PREFERRED EMBODIMENTS

Figure 1A:
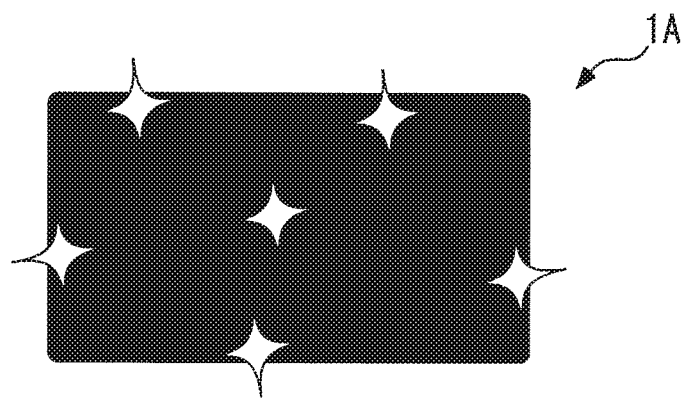
FIGS. 1A and 1B are a plan view and a cross-sectional view, respectively, of a decorative molded article according to a first embodiment of the present invention, in a state in which a light source is off.
Figure 1B:
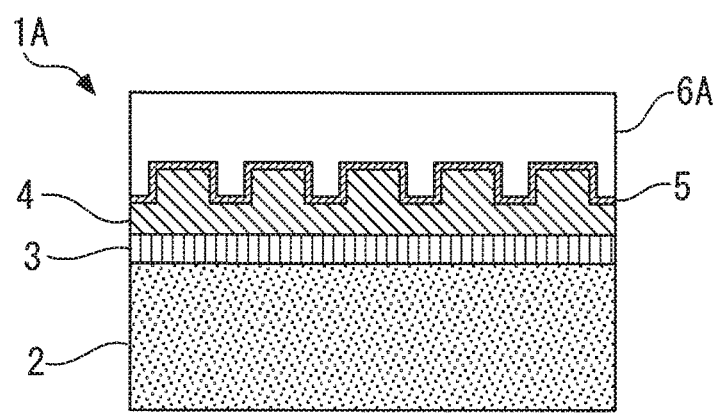
Figure 1B:
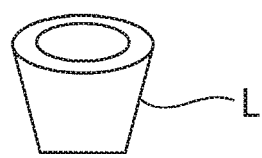
Figure 2A:
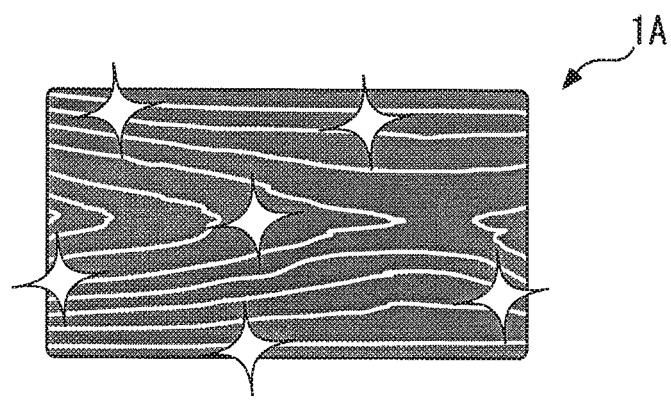
Figure 2B:
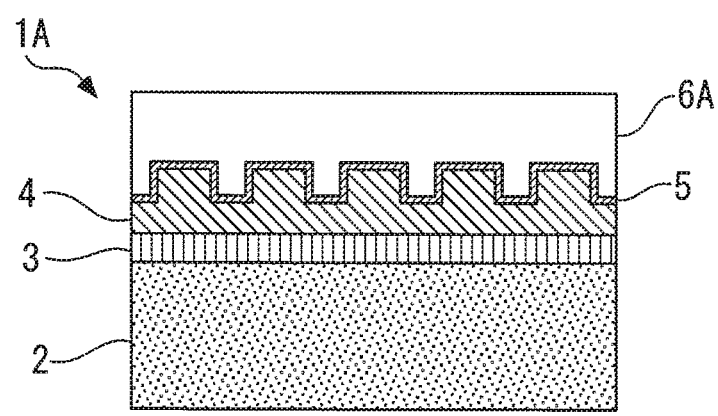
Figure 2B:
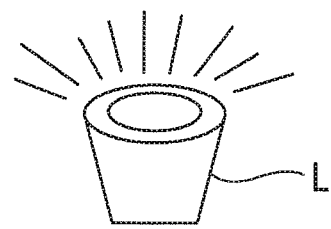

The present invention will now be described in detail with reference to the drawings showing preferred embodiments thereof. FIGS. 1A to 2B shows a decorative molded article according to a first embodiment of the present invention. FIGS. 1A and 1B show a state of the decorative molded article when a light source disposed on a back surface side thereof is off, while FIGS. 2A and 2B show a state of the decorative molded article when the light source is on. As shown in these figures, the decorative molded article, denoted by reference numeral 1A, is comprised of a base 2, a wood veneer 4 provided on a front surface side (an upper side in FIGS. 1B and 2B) thereof via a reinforcing member 3, a colored coating layer 5 formed by coating a front surface side of the wood veneer 4 with a paint having a predetermined color (black in the present embodiment), and a clear coating layer 6A formed by coating a front surface side of the colored coating layer 5 with a transparent paint, and these components are integrally formed.

The base 2 ensures strength and rigidity of the decorative molded article and is formed to be fairly thicker than the wood veneer 4. Further, the base 2 is made of a transparent or translucent synthetic resin, such as polycarbonate or polystyrene, which is permeable to light produced by the light source, denoted by reference symbol L, provided on the back surface side thereof.

The wood veneer 4 is provided for causing a natural grain of the wood veneer 4 itself to appear on the front surface side of the decorative molded article 1A, and is formed by slicing wood material of a predetermined kind (e.g. walnut, maple, ash, or the like) to a very small predetermined thickness (e.g. 200 μm) such that it has a grain and is permeable to light from the light source L. Note that as shown in FIG. 1B, an upper portion in cross-section of the wood veneer 4 is illustrated as alternating protrusions and recesses, for clarity, so as to represent the grain (including vessels opening outward) thereof.

The reinforcing member 3 reinforces the wood veneer 4 which is easy to crack, and also functions as an anchoring layer for joining and integrating the base 2 by injection molding. Further, the reinforcing member 3 is formed to be permeable to light from the light source L, and is made of a fibrous material, such as a nonwoven fabric, a woven fabric, or Japanese paper, a wood veneer, a resin film, or a composite of any of these materials.

The colored coating layer 5 is formed by coating the wood veneer 4 with a predetermined black paint (e.g. urethane paint) as a thin film having a predetermined thickness (e.g. 10 μm) such that the vessels of the wood veneer 4 are not buried. Further, the colored coating layer 5 is configured such that the grain of the wood veneer 4 is made difficult to visually recognize from the front surface side when the light source L is off and is recognizable when the same is on.

The clear coating layer 6A is formed by coating the colored coating layer 5 with a predetermined clear paint which is colorless and transparent (e.g. a polyester paint), as a thick film having a relatively large predetermined thickness (e.g. 600 μm) such that the vessels of the wood veneer 4 are buried. Further, the clear coating layer 6A is polish-finished by a predetermined surface treatment (e.g. buffing or top-coating).

The decorative molded article 1A thus constructed is applied to an interior component of an automotive vehicle, specifically, a figure panel for an instrument panel or a center console, and the light source L is disposed on the back surface side thereof. As mentioned above, FIGS. 1A and 1B show the decorative molded article 1A in the state in which the light source L is off. In this case, light is not irradiated from the back surface side of the decorative molded article 1A, so that as shown in FIG. 1A, on the front surface of the decorative molded article 1A, a so-called piano black design is caused to appear by the colored coating layer, which is black, and by the clear coating layer 6A, which is glossy.

On the other hand, FIGS. 2A and 2B show the decorative molded article 1A in the state in which the light source L is on. As shown in these figures, when the light source L is on, light from the light source passes from the back surface side to the front surface side, so that as shown in FIG. 2A, on the front surface of the decorative molded article 1A, a design is caused to appear which looks as if the grain of the wood veneer 4 rises to the surface. Note that although the grain of the wood veneer 4 illustrated in FIG. 2A shows a flat grain pattern, for convenience' sake, there can be caused to appear any of various patterns dependent on a type of wood and a location in the wood from which the wood veneer 4 is sliced.

As described above, according to the decorative molded article 1A according to the first embodiment, when the light source L is off, on the front surface side of the decorative molded article 1A, a piano black design is caused to appear by the black color of the colored coating layer 5 and the clear coating layer 6A, whereas when the light source L is on, on the front surface side of the decorative molded article 1A, a design is caused to appear which looks as if the grain of the wood veneer 4 rises to the surface. Thus, it is possible to cause designs which are very different from each other to appear on the front surface side of the decorative molded article 1A, when the light source L is off and when the same is on, respectively.

FIG. 3A to 6B show decorative molded articles according to other embodiments of the present invention. In these embodiments, only the construction of the clear coating layer 6A is different from the decorative molded article 1A, and hence, in the following description, the same components are denoted by the same reference numerals, and mainly different points are described.

Figure 3A:
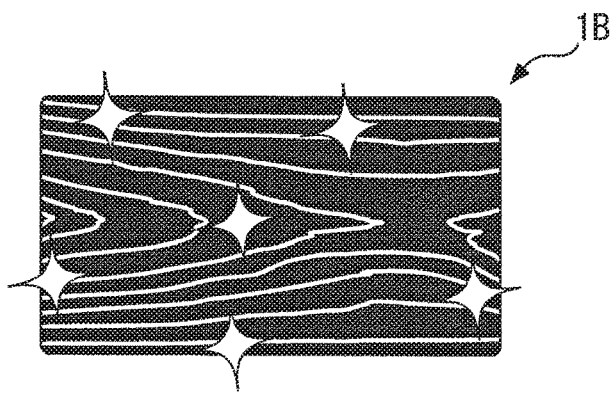
Figure 3B:
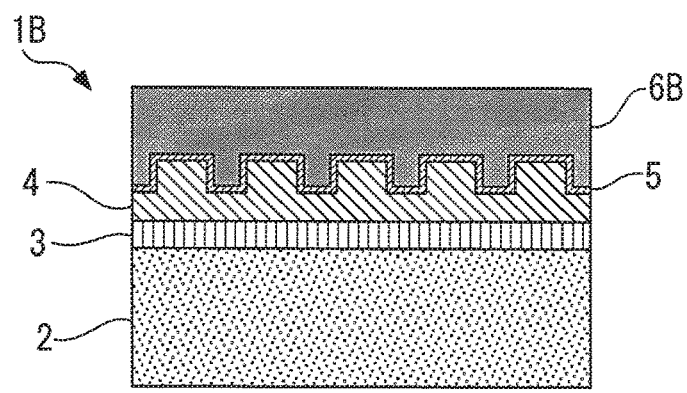
Figure 3B:
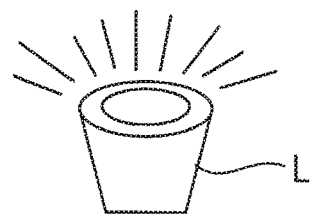

In a decorative molded article 1B according to a second embodiment shown in FIGS. 3A and 3B, a clear coating layer 6B is formed as a colored clear coating layer in which a paint having the same black color as the colored coating layer 5 is substantially uniformly mixed at a predetermined ratio. By thus providing the colored clear coating layer 6B on the colored coating layer 5 laminated on the wood veneer 4, it is possible, when the light source L is off, to maintain a glossy piano black design on the decorative molded article 1B, similar to the decorative molded article 1A according to the first embodiment, described above, and on the other hand, it is possible, when the light source L is on, to obtain a design in which the grain is caused to appear more clearly than in the decorative molded article 1A.

Figure 4:
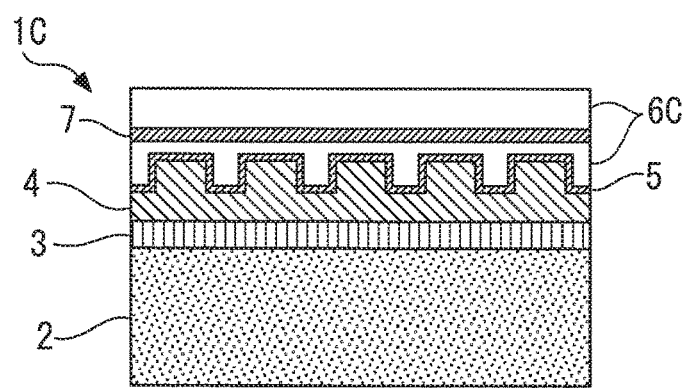
FIG. 4 is a cross-sectional view of a decorative molded article according to a third embodiment of the present invention.

In a decorative molded article 1C according to a third embodiment shown in FIG. 4, a clear coating layer 6C has a colored coating layer 7 (other colored coating layer) provided thereinside. More specifically, the clear coating layer 6C is constructed by forming, on the colored coating layer 5 laminated on the wood veneer 4, the clear coating layer 6C (first clear coating layer) similar to the clear coating layer 6A in the first embodiment such that vessels of the wood veneer 4 are buried, and by not only forming the colored coating layer 7 similar to the colored coating layer 5 on the clear coating layer 6C, but also forming the clear coating layer 6C (second clear coating layer) on the colored coating layer 7 to a predetermined thickness. Note that the colored coating layer 7 may be the same color as the colored coating layer 5 on the wood veneer 4 or may have a different color from the color of the same.

By thus providing the colored coating layer 7 within the clear coating layer 6C, it is possible to obtain the decorative molded article 1C causing designs to appear which are substantially similar to those of the decorative molded article 1B in the second embodiment described above, when the light source L is off and when the light source L is on. Further, by forming the clear coating layer 6C on the colored coating layer 7 to a relatively large thickness, it is possible to form the front surface of the decorative molded article 1C such that it has an increased depth feeling. Further, before forming the colored coating layer 7, the front surface of the clear coating layer 6C thereunder is smoothed, and then the colored coating layer 7 is laminated on the smoothed surface of the clear coating layer 6C, whereby the front surface of the decorative molded article 1 formed to be uniform in color.

Figure 5A:
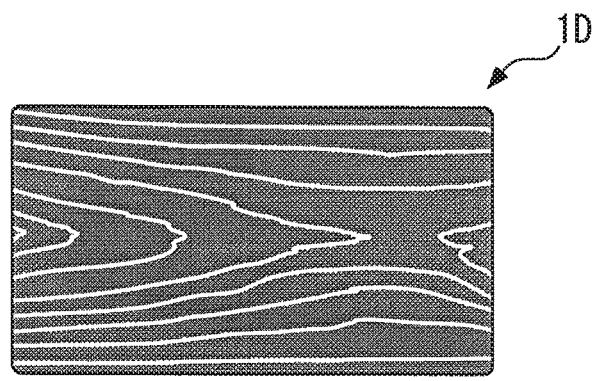
Figure 5B:
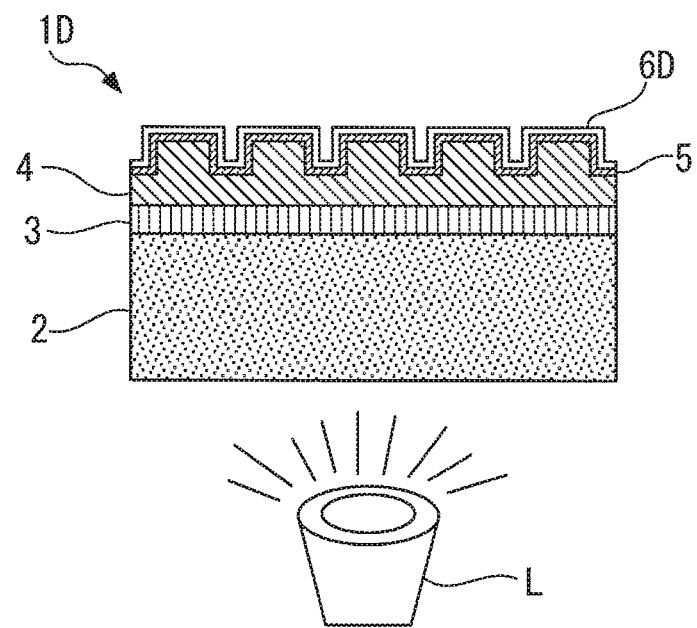

In a decorative molded article 1D according to a fourth embodiment shown in FIGS. 5A and 5B, a clear coating layer 6D is formed by coating the colored coating layer 5 laminated on the wood veneer 4 with a clear paint similar to that in the first embodiment, as a thin film having such a predetermined thick as will not cause the vessels of the wood veneer 4 to be buried. By thus laminating the colored coating layer 5 and the clear coating layer 6D on the wood veneer 4 in a state in which the vessels of the wood veneer 4 are open, it is possible to cause, differently from the decorative molded article 1A according to the first embodiment, a black design to appear in which the front surface of the decorative molded article 1D is matted, when the light source L is off (see FIG. 8F), and a design to appear which looks as if the grain of the wood veneer 4 rises to the front surface of the decorative molded article 1D. Moreover, the front surface of the decorative molded article 1D is with an open-pore finish in which the vessels of the wood veneer 4 remain. As a consequence, it is possible to obtain the decorative molded article 1D of which the front surface has a concave convex feeling. Note that, although omitted from illustration, it is also possible to provide the colored coating layer 7 similar to that of the decorative molded article 1C described above with reference to FIG. 4.

Figure 6A:
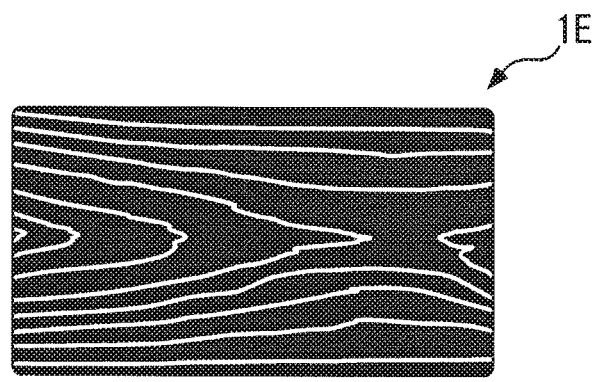
Figure 6B:
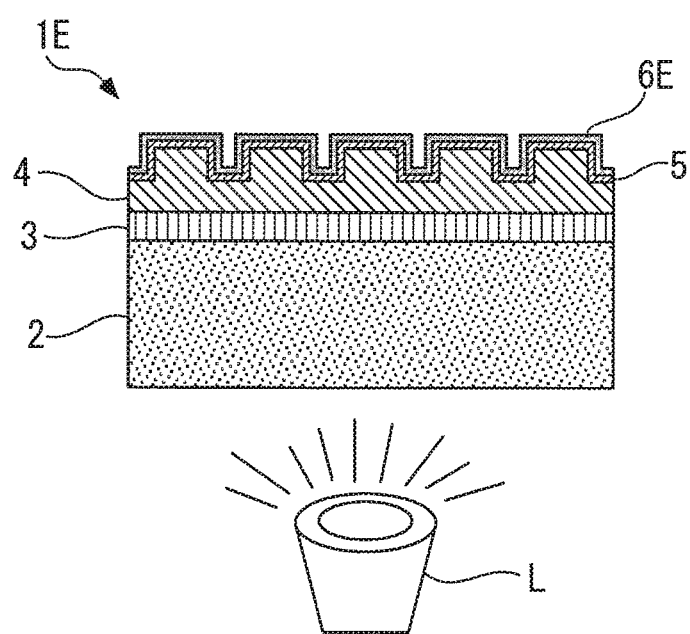

In a decorative molded article 1E according to a fifth embodiment shown in FIGS. 6A and 6B, a clear coating layer 6E is formed as a thin film similar to the clear coating layer 6D in the fourth embodiment and at the same time is colored similar to the colored clear coating layer 6B in the second embodiment. The decorative molded article 1E is not only capable of providing the same advantageous effects as the decorative molded article 1D according to the fourth embodiment but also is capable of providing a design in which the grain of the wood veneer 4 is caused to appear more clearly when the light source L is on.

Next, methods of manufacturing the decorative molded articles 1A to 1E described above will be described with reference to FIGS. 7A to 8G. Note the decorative molded articles 1A to 1E are roughly classified into the decorative molded articles 1A to 1C with a mirror finish, of which the front surface is glossy, and the decorative molded articles 1D and 1E with an open-pore finish, of which the front surface has a concave convex feeling. Therefore, in the following description, a method of manufacturing the decorative molded article 1A with a mirror finish will be described with reference to FIGS. 7A to 7G, and a method of manufacturing the decorative molded article 1D with an open-pore finish will be described with reference to FIGS. 8A to 8G.

Figure 7A:
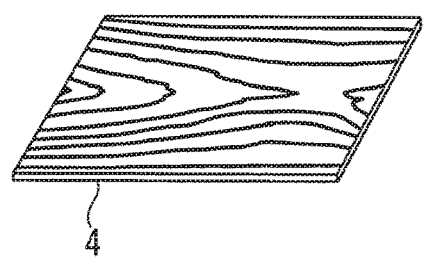
FIGS. 7A to 7G are views showing a sequence of steps of a method of manufacturing a decorative molded article with a mirror finish.
Figure 7B:
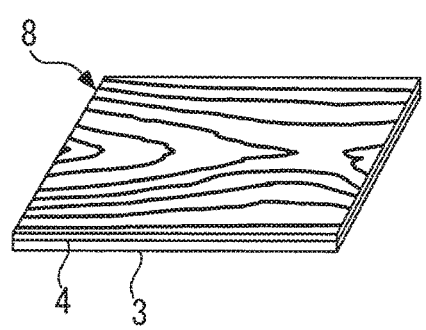
Figure 7C:
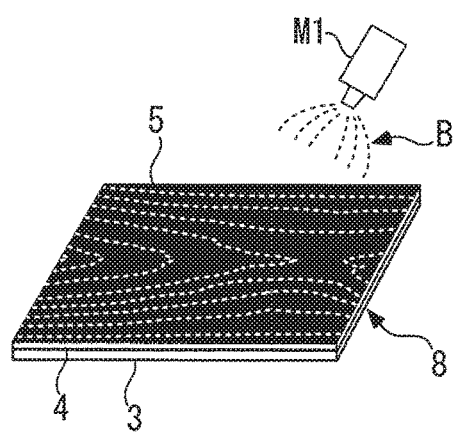
Figure 7D:
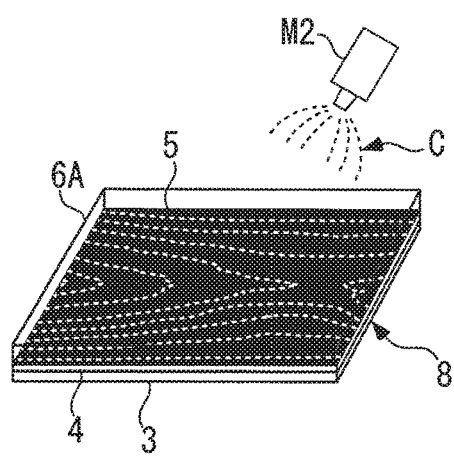

As shown in FIGS. 7A to 7G, in the case of manufacturing the decorative molded article 1A with a mirror finish, first, the wood veneer 4 constructed as described hereinabove is prepared (FIG. 7A), and then the reinforcing member 3 is bonded to the back surface side of the wood veneer 4 to thereby form a wood veneer sheet 8 (FIG. 7B). Then, color coating is performed e.g. by a coating machine M1, for coating the front surface of the wood veneer sheet 8 with a black paint B (FIG. 7C). This forms the colored coating layer 5 having a predetermined thickness (e.g. 10 μm) on the front surface of the wood veneer sheet 8. Further, prior to the color coating, it is preferable that on the front surface of the wood veneer sheet 8, not only wiping coloring is performed for coloring the wood veneer 4, but also sealer coating is performed for suppressing impregnation of the black paint B into the wood veneer 4. Note that in FIG. 7 and FIGS. 7D to 7E, the grain of the wood veneer 4 intrinsically difficult to visually recognize is indicated by broken lines, for convenience' sake.

Figure 7E:
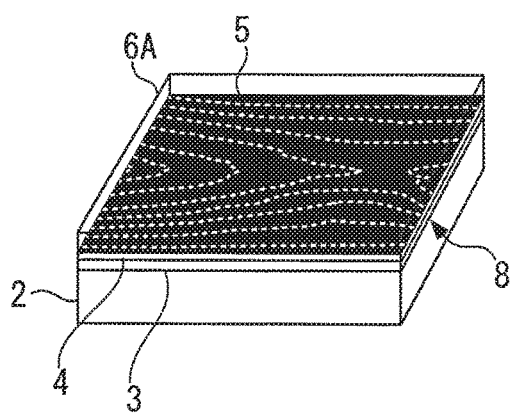
Figure 7F:
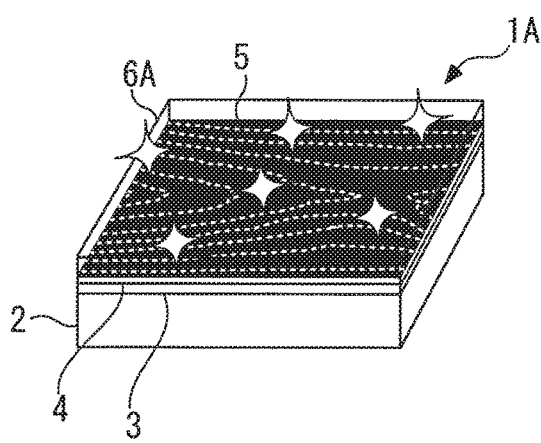
Figure 7G:
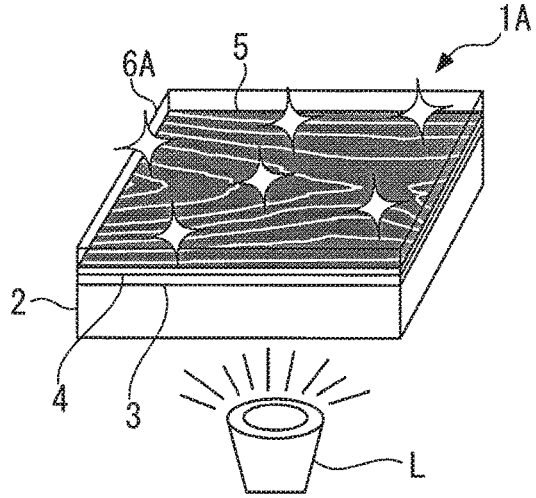

Next, clear coating is performed e.g. by a coating machine M2 for coating the front surface of the wood veneer sheet 8 subjected to the color coating (FIG. 7D) with clear paint C. This clear coating is performed by wet-on-wet coating in which coating to a predetermined thickness (e.g. 300 μm) is executed two separate times. Then, the wood veneer sheet 8 subjected to the clear coating is set within a mold (not shown), and molten synthetic resin is injected to the back surface side of the wood veneer sheet 8 to perform insert molding. This forms the base 2 on the back surface side of the wood veneer sheet 8 in a state integrated therewith, and the resulting insert-molded article as a whole has a predetermined shape (FIG. 7E). Then, the front surface of the clear coating layer 6A on the insert-molded article is medium polished and thereafter mirror-finished (e.g. buffed or top-coated), whereby the decorative molded article 1A is completed (FIG. 7F). The decorative molded article 1A with a mirror finish thus manufactured causes a piano black design to appear on the front surface thereof when the light source L is off whereas causes a design to appear which looks as if the grain of the wood veneer 4 rises to the front surface thereof when the light source L is on.

Figure 8A:
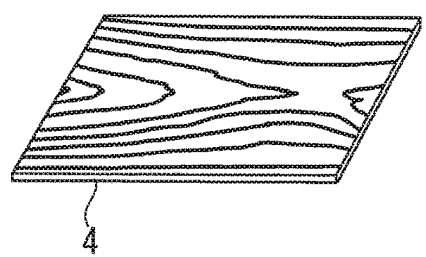
FIGS. 8A to 8G are views showing a sequence of steps of a method of manufacturing a decorative molded article with an open-pore finish.
Figure 8B:
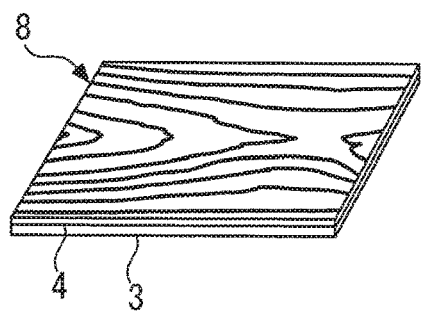
Figure 8C:
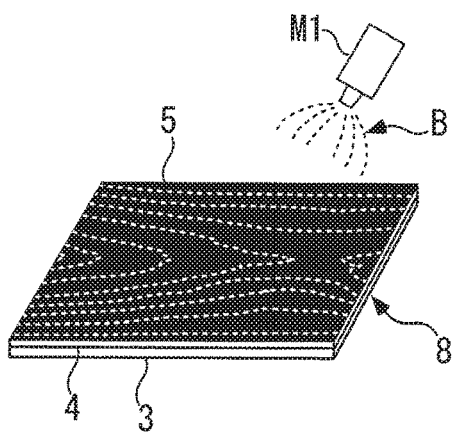
Figure 8D:
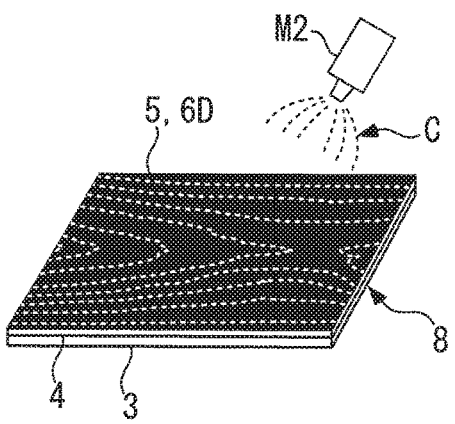

On the other hand, as shown in FIGS. 8A to 8G, in the case of manufacturing the decorative molded article 1D with an open-pore finish, while steps in FIGS. 8A to 8C are the same as the steps described above with reference to FIGS. 7A to 7C for the decorative molded article 1A with a mirror finish. More specifically, the respective steps of preparation of the wood veneer 4, bonding of the reinforcing member 3, and color coating of the wood veneer sheet 8 are common between the respective manufacturing processes of the two decorative molded articles 1A and 1D. Note that, in FIG. 8C and FIGS. 8D to 8F, referred to hereinafter, similar to FIGS.

7C to 7F, the grain of the wood veneer 4 intrinsically difficult to visually recognize is indicated by broken lines, for convenience' sake.

Figure 8E:
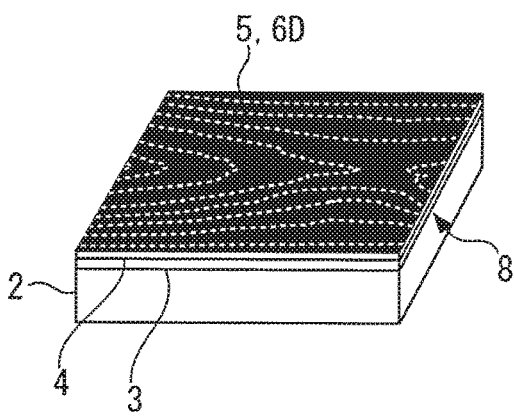
Figure 8F:
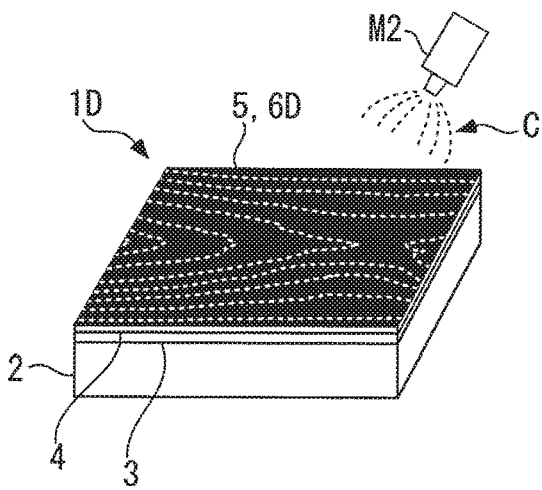
Figure 8G:
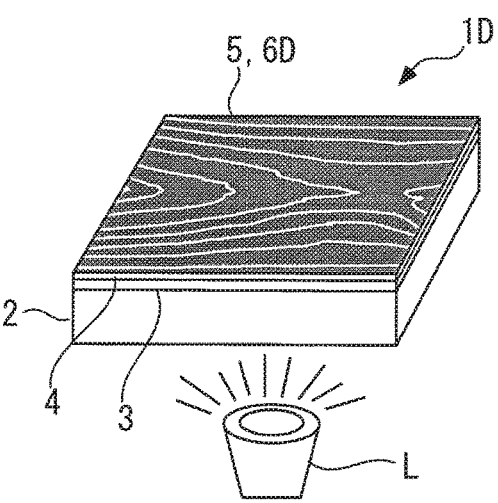

After the color coating, surface protection clear coating is performed by the coating machine M2 for coating the front surface of the wood veneer sheet 8 (FIG. 8D) with the clear paint C. The surface protection clear coating is distinguished from the corresponding step of the manufacturing process of the decorative molded article 1A with a mirror finish, described above, in that the clear coating layer 6D having a very thin predetermined thickness (e.g. 10 µm) is formed. Then, the wood veneer sheet 8 subjected to the surface protection clear coating is set within a mold (not shown), similarly to the corresponding step of the manufacturing process of the decorative molded article 1A with a mirror finish, described above, and molten synthetic resin is injected to the back surface side of the wood veneer sheet 8 to perform insert molding. This forms the base 2 on the back surface side of the wood veneer sheet 8 in a state integrated therewith, and the resulting insert-molded article as a whole has a predetermined shape (FIG. 8E). Then, the front surface of the clear coating layer 6D on the insert-molded article is medium polished, and then, matte clear coating is performed e.g. by the coating machine M2, again, for coating the front surface thereof with the clear paint C to form the clear coating layer 6D having the predetermined thickness (e.g. 10 µm), whereby the decorative molded article 1D is completed (FIG. 8F). The decorative molded article 1D with an open-pore finish thus manufactured causes a black design with a matted surface to appear on the front surface thereof when the light source L is off whereas causes a design to appear which looks as if the grain of the wood veneer 4 rises to the front surface thereof when the light source L is on. The decorative molded article 1D is with an open-pore finish in which the front surface always has a concave convex feeling.

As described in detail heretofore, according to the decorative molded articles 1A to 1E according to the first to fifth embodiments, when the light source L is off, it is difficult to visually recognize the grain of the wood veneer 4 so that a design based on the colored coating layer 5 and one of the clear coating layers 6A to 6E appears, whereas when the light source L is on, it is possible to visually recognize the grain of the wood veneer 4, causing a design to appear which looks as if the grain rises to the front surface. Thus, it is possible to obtain the decorative molded articles 1A to 1E each of which is capable of making the design appearing on the front surface side thereof largely different between when the light source L is off and when the same is on. Further, according to the decorative molded articles 1A to 1C with a mirror finish, it is possible to cause a piano black design with a black and glossy surface to appear when the light source L is off, whereas according to the decorative molded articles 1D and 1E with an open-pore finish, it is possible to always obtain a design having a surface having a concave convex feeling.

Note that the present invention is not limited to the above-described embodiment, but it can be practiced in various forms. For example, although in the above-described embodiment, as the colored paint, the black paint is used, it is also possible to use a colored paint having a color (e.g. brown or dark blue) other than black. Further, details of the constructions of the decorative molded articles 1A and 1E described in the embodiments are given only by way of example, and they can be changed as appropriate within the scope of the subject matter of the present invention.

What is claimed is:

1. A decorative molded article that is configured to be capable of being illuminated by a light source disposed on a back surface side thereof, and cause designs different from each other to appear on a front surface side thereof, when the light source is off and when the light source is on, respectively, comprising:
    a base that is made of a predetermined synthetic resin permeable to light from the light source, and is disposed in the vicinity of the light source;
    a wood veneer that is formed by slicing wood such that the wood veneer has a grain and is permeable to light from the light source, the wood veneer being disposed on a front surface side of the base;
    a colored coating layer that is formed on a front surface side of the wood veneer by coating with a black colored paint, for making the grain of the wood veneer impossible to visually recognize when the light source is off and making the grain of the wood veneer visually recognizable when the light source is on; and
    a clear coating layer that is formed on a front surface side of the colored coating layer by coating with a transparent clear paint,
    wherein by smoothing a front surface of the clear coating layer, a black piano design with a black and glossy surface is caused to appear, when the light source is off.

2. The decorative molded article according to claim 1, wherein the wood veneer has vessels opening outward, on the front surface side thereof, and wherein the colored coating layer and the clear coating layer are each formed as a thin film having such a predetermined thickness that the vessels are not buried.

3. The decorative molded article according to claim 1, wherein the wood veneer has vessels opening outward, on the front surface side thereof, wherein the colored coating layer is formed as a thin film having such a predetermined thickness that the vessels are not buried, and wherein the clear coating layer is formed as a thick film having such a predetermined thickness that the vessels are buried.

4. The decorative molded article according to claim 1, wherein the clear coating layer is formed as a colored clear coating layer in which the colored paint is mixed with the clear paint.

5. The decorative molded article according to claim 1, wherein the clear coating layer includes: a first clear coating layer laminated on the front surface of the colored coating layer, and a second clear coating layer laminated on another colored coating layer formed by coating a front surface of the first clear coating layer with a colored paint having a predetermined color.

6. The decorative molded article according to claim 1, wherein a reinforcing member configured to be permeable to light from the light source is disposed between the wood veneer and the base.

* * * * *